United States Patent
Roozbeh et al.

(10) Patent No.: US 12,293,227 B2
(45) Date of Patent: May 6, 2025

(54) MEMORY ALLOCATION IN A HIERARCHICAL MEMORY SYSTEM

(71) Applicant: Telefonaktiebolaget LM Ericsson (publ), Stockholm (SE)

(72) Inventors: Amir Roozbeh, Stockholm (SE); Alireza Farshin, Stockholm (SE); Dejan Kostic, Solna (SE); Gerald Q. Maguire, Jr., Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1003 days.

(21) Appl. No.: 17/254,195

(22) PCT Filed: Jun. 20, 2019

(86) PCT No.: PCT/SE2019/050596
§ 371 (c)(1),
(2) Date: Dec. 18, 2020

(87) PCT Pub. No.: WO2019/245445
PCT Pub. Date: Dec. 26, 2019

(65) Prior Publication Data
US 2021/0191777 A1 Jun. 24, 2021

(30) Foreign Application Priority Data
Jun. 21, 2018 (WO) ................. PCT/SE2018/050676

(51) Int. Cl.
*G06F 9/50* (2006.01)
*G06F 12/0811* (2016.01)

(52) U.S. Cl.
CPC ........ *G06F 9/5016* (2013.01); *G06F 12/0811* (2013.01); *G06F 2212/608* (2013.01)

(58) Field of Classification Search
CPC ............... G06F 9/5016; G06F 12/0811; G06F 2212/608; G06F 2212/1024;
(Continued)

(56) References Cited

U.S. PATENT DOCUMENTS 5,329,489 A * 7/1994 Diefendorff ........ G06F 12/0893
711/E12.041
9,836,400 B2 12/2017 Wang et al.
(Continued)

FOREIGN PATENT DOCUMENTS

CN 106484539 A 3/2017
WO 2009/021835 A1 2/2009

OTHER PUBLICATIONS

International Search Report and Written Opinion issued in International Application No. PCT/SE2019/050596 dated Sep. 16, 2019 (13 pages).
(Continued)

*Primary Examiner* — Jorge A Chu Joy-Davila
(74) *Attorney, Agent, or Firm* — Rothwell, Figg, Ernst & Manbeck, P.C.

(57) ABSTRACT

A memory allocator in a computer system comprising a plurality of CPU cores (5101-5104) and a first (530) and a second (5120) memory unit having different data access times and wherein each one of the first and the second memory units is divided into memory portions wherein each memory portion (SLICE 0-3) in the second memory unit is associated with at least one memory portion (A-G) in the first memory unit, and wherein each memory portion in the second memory unit is associated with a CPU core. If at least a predetermined number of memory portions in the first memory unit being part of the available requested memory is associated with the memory portion in the second memory unit that is associated with the CPU core on which the
(Continued)

requesting application is running, the requested available memory is allocated to the requesting application.

15 Claims, 10 Drawing Sheets

(58) Field of Classification Search
CPC ......... G06F 2212/6046; G06F 12/0864; G06F 12/084; Y02D 10/00
See application file for complete search history.

(56) References Cited

U.S. PATENT DOCUMENTS

| | | | |
|---|---|---|---|
| 10,103,902 B1 * | 10/2018 | Sampath | H04L 12/66 |
| 2014/0006715 A1 | 1/2014 | Saraf et al. | |
| 2015/0370823 A1 * | 12/2015 | Laker | G06F 16/13 |
| | | | 707/743 |
| 2017/0052741 A1 * | 2/2017 | Hassan | G06F 3/0637 |
| 2019/0121563 A1 * | 4/2019 | Cohen | G06F 3/0673 |
| 2019/0278849 A1 * | 9/2019 | Chandramouli | G06F 9/526 |

OTHER PUBLICATIONS

Clémentine, M., et al, "Reverse Engineering Intel Last-Level Cache Complex Addressing Using Performance Counters", Dec. 12, 2015 (Dec. 12, 2015), International Conference on Computer Analysis of Images and Patterns. CAIP 2017: Computer Analysis of Images and Patterns; [Lecture Notes in Computer Science; Lect.Notes Computer], Springer, Berlin, Heidelberg, pp. 48-65, XP047330257, ISBN: 9783642173189.

\* cited by examiner

MEMORY ALLOCATION IN A HIERARCHICAL MEMORY SYSTEM

CROSS REFERENCE TO RELATED APPLICATION(S)

This application is a 35 U.S.C. § 371 National Stage of International Patent Application No. PCT/SE2019/050596, filed Jun. 20, 2019, designating the United States and claiming priority to International Patent Application No. PCT/SE2018/050676, filed on Jun. 21, 2018. The above identified applications are incorporated by reference.

TECHNICAL AREA

Embodiments herein relate to the allocation of memory to applications running on central processing units (CPUs) having a hierarchical memory system.

BACKGROUND

Computer systems comprise central processing units (CPUs) connected to the memory. The CPU fetches different instructions and data from memory found on the processor chip, known as CPU cache. The CPU cache is made of very fast static random-access memory (static RAM or SRAM) which is an expensive resource. To deal with this issue, the computer system extends a memory system by a hierarchy of cheaper and slower memory such as dynamic RAM (DRAM), Non-volatile memory (NVM), and Local secondary storage. The processor keeps recently-used data in a cache to reduce the memory access time. In modern processors (as illustrated by FIG. 1), also the cache is implemented in a hierarchal manner, Layer 1 caches (L1), Layer 2 caches (L2), and a Layer 3 cache (L3), also known as Last Level Cache (LLC). The L1 and L2 cache are private to each CPU core while LLC is shared among all CPU cores.

As seen in Table 1, access to the data in different levels of memory hierarchy has different cost. As an example, fetching a data from L1 cache costs around 4 CPU cycle (around 1.25 ns in CPU with 3.2 GHz clock cycle) and accessing a main memory costs around 200 CPU cycle (62.5 ns), for the CPU with 3.2 GHz clock cycle, almost 50 time more expensive compared to L1.

TABLE 1

Example of access latency to different cache layers and DRAM in a CPU with 3.2 GHz frequency. These numbers might vary for different generations of hardware.

| Memory hierarchy | Access latency (cycle) | Access latency (ns) |
| --- | --- | --- |
| L1 CACHE | ~4 cycles | 1.25 ns |
| L2 CACHE | ~10 cycles | 3.125 ns |
| L3 CACHE | ~30-50 cycles | 9.375-15.625 ns |
| Local Dram | ~200-300 cycles (60 ns) | 62.5-93.75 ns |
| remote DRAM | >300 cycles | >90.75 ns |

In some implementations such as in Intel's processors, the LLC is divided into multiple slices, one associated with each core. FIG. 2 shows an example of a CPU socket 200 with 4 CPU cores #0-#3 and an LLC 220 with (but not limited to) four slices 0-3. The CPU cores and all LLC slices are interconnected (e.g., by a bi-directional ring bus or other interconnects 210. Hence all slices are accessible by all cores.

The physical memory address of data in the DRAM defines the slice in the LLC 200 in which the data will be loaded. Intel uses a hash function to map and distribute the main memory physical addresses into different slices.

The hash function is reversed engineered and partly described the public paper '*Reverse Engineering Intel Last-Level Cache Complex Addressing Using Performance Counters*' by Clémentine Maurice et al published 2015.

The hash function receives the physical address as an input and defines which slice that particular address should be loaded. The top part of FIG. 3 demonstrates the address of one memory block in system with 64-bit memory address space. Assuming an application running on one CPU core requests for a memory at its start time and the system gave the application a memory with a physical address and that the application stored some data at that address. Assuming the application during its execution need the data stored on that physical address. Then, the application, and consequently the CPU, sends a request to the system to fetch from memory. The system/OS (operating system) will send N bits of a physical address in to Hash Function. The output of hash function $(O_0 O_1 \ldots O_m)$ defines the slice in which the data from that address should be loaded. $(O_0 O_1 \ldots O_m)$ is binary representative of slice number. E.g., 110 is slice number of 6.

Due to the differences in physical distance between a CPU core and the different slices, it is expected that accessing data loaded in the direct map slice be faster than the other slices. Measurements to prove this has been performed on a CPU socket with eight cores and eight slices (0-7) and are described in the paper *Make the Most out of Last Level Cache in Intel Processors* by Farshin et al from the 14th Eurosys Conference 2019. As seen in FIG. 4, accessing data from different slices has a different cost. An application is running on for example on core 0, reading and writing data from slice zero will be faster than other slices. In some cases, the difference can be up to 20 CPU cycle per memory access.

In the existing solutions, the memory management unit (MMU) sees the whole memory as one single block with same characteristics and access time. When an application requests the MMU of the system/OS to select the memory from available memory in DRAM the selection is done without the notion of how this memory will be mapped to LLC slices. As a result, the assigned memory to the application can end up in any of slices when the application and consequently the CPU core that application is running on, requesting the data stored in that address.

SUMMARY

With this background it is the object of the embodiments described below to obviate at least one of these disadvantages. The object is achieved by a method and a memory allocator in a computer system for allocating memory to an application. The computer system comprises computer servers that comprises a plurality of CPU cores and at least a first and a second memory unit having different data access times. Each memory unit is divided into memory portions wherein at least one first portion in the first memory unit is mapped to one second portion in the second memory unit, and wherein the second portion is associated with a CPU core.

The method comprising the steps of receiving from an application a request for allocating memory to the application and to determine if the requested memory is available in the first memory unit.

If the requested memory is available in the first memory unit, the mappings between the first memory portions in the available requested memory and the second memory portions in the second memory unit is determined. If at least a predetermined number of the first portions in the available requested memory is mapped to the second portion that is associated with the CPU core on which the requesting application is running, allocate the available requested memory to the requesting application.

In one embodiment, the first memory unit is a dynamic random-access memory DRAM and the second memory unit is a last level cache LLC wherein the second memory portion is an LLC slice.

The proposed solution enhances the application performance by selecting suitable address spaces of memory based on the application requirements. This allows using the memory more efficiently and improving application performance. It also reduces power consumption of the CPU as the CPU will wait less time for data to be present in its L1 cache.

With this slice aware memory allocation method, it is possible to improve the system performance up to around 20%.

DETAILED DESCRIPTION

Figure 1:
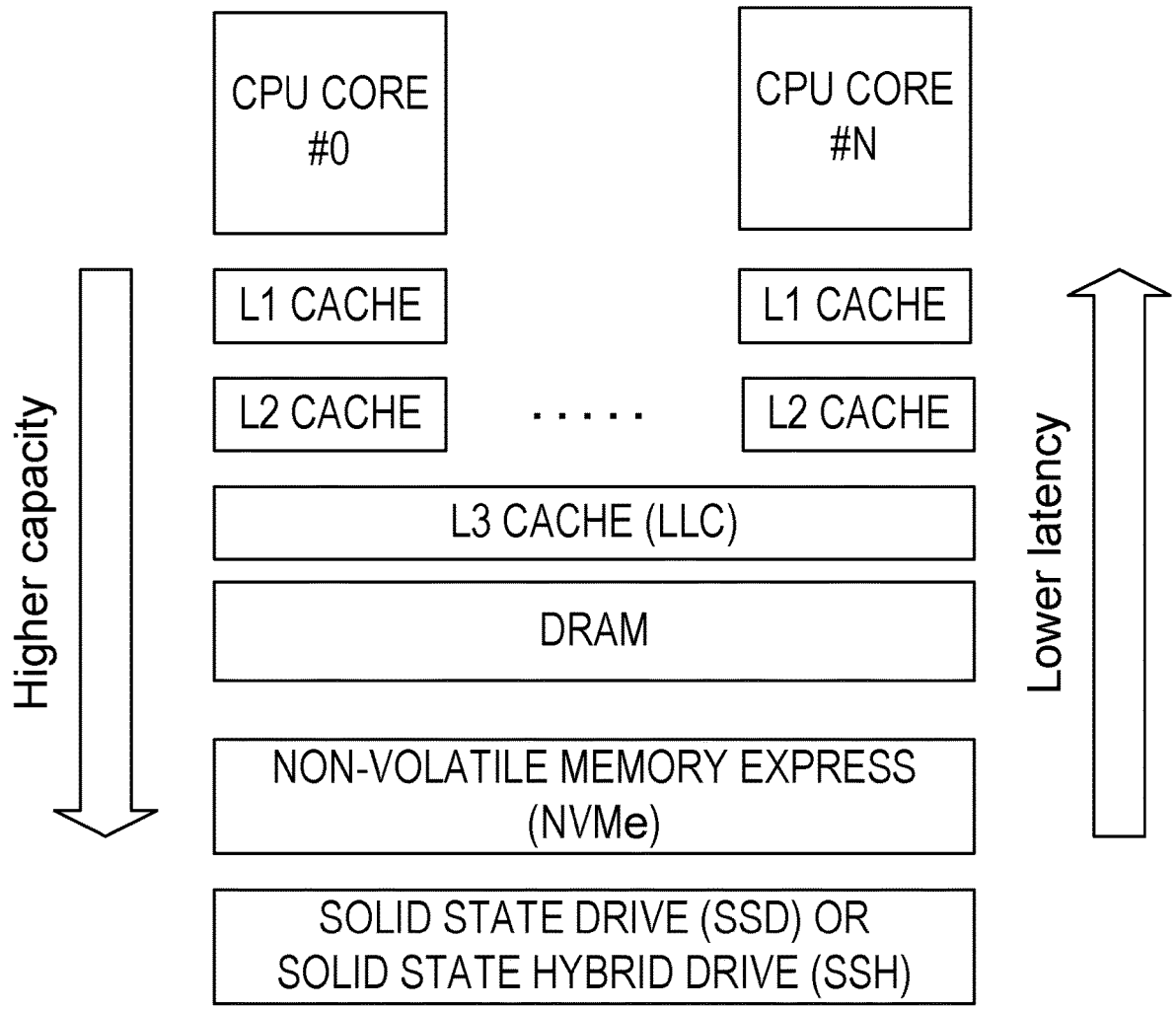
FIG. 1 is a block diagram illustrating a set of CPU cores with caches that are implemented in a hierarchical manner.
Figure 2:
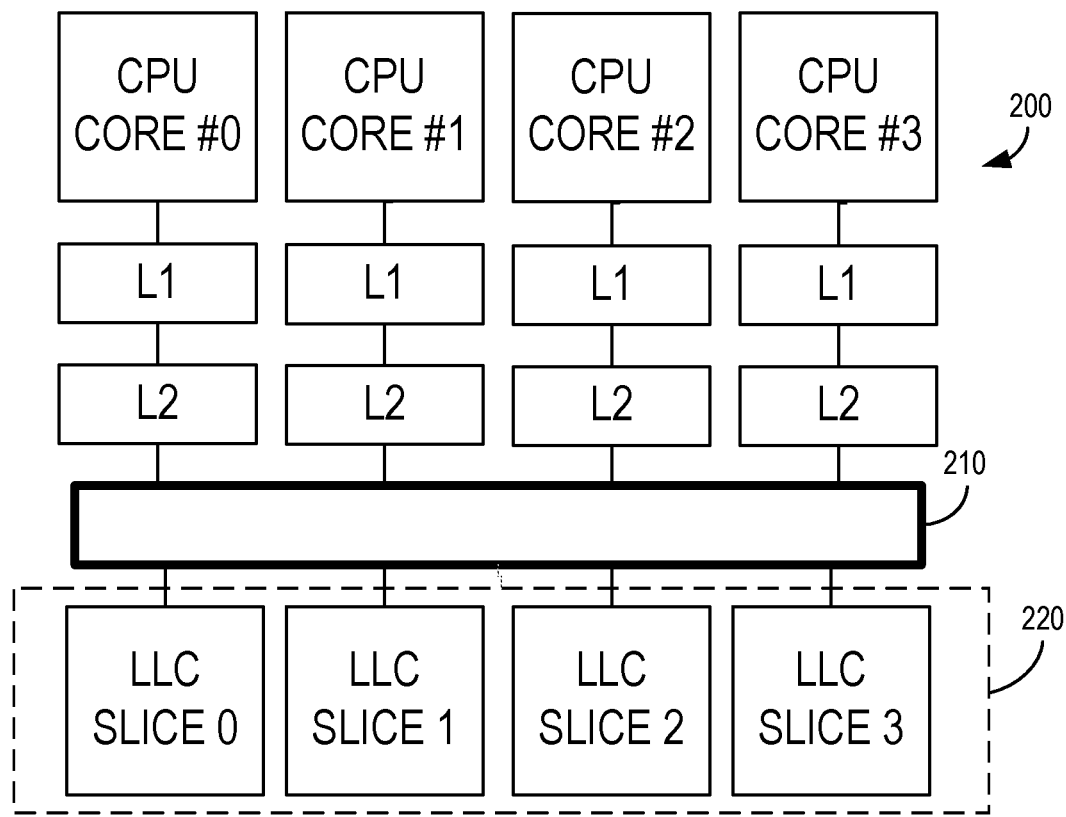
FIG. 2 is a block diagram illustrating a set of CPU cores with caches that are implemented in a hierarchical manner and with LLC slices.
Figure 3:
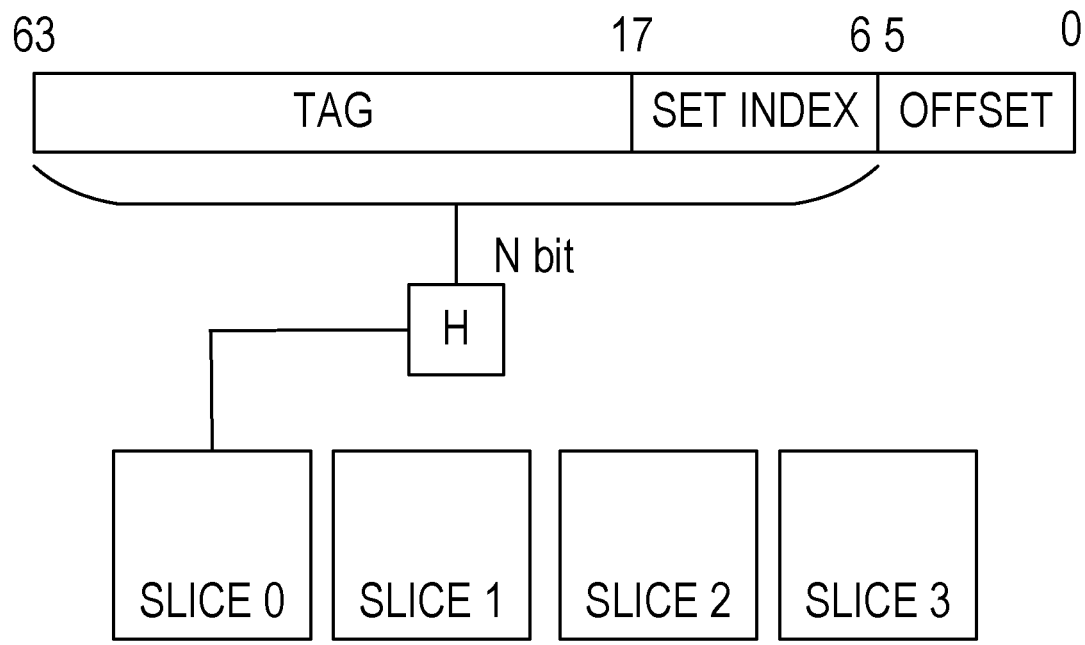
FIG. 3 is a block diagram illustrating the hash function that defines in which slice the data from the DRAM should be loaded.

Computer systems (and servers) consist of CPU and memory. The CPU executes the instructions and operates on a data stored in a memory. The CPU can only perform operations on data when the data is available in the layer 1 L1 cache. As all the application data will not fit into the L1 cache, the memory can be realized in a hierarchy as seen in FIG. 1.

When the application and consequently the CPU needs access to a specific memory address, it checks if data is available in L1 or not. If the data is not available in L1, then other levels of memory will be evaluated one by one (e.g., first L2, then LLC, and finally the DRAM and so on). If the data is available in any of the memory levels, the data will be copied to the upper level of memory including L1 cache. FIG. 1 illustrates a three-level hierarchy with L1, L2 and an LLC. Other CPUs may use only two-level hierarchies where L2 could be seen as the shared last level cache LLC.

Figure 5:
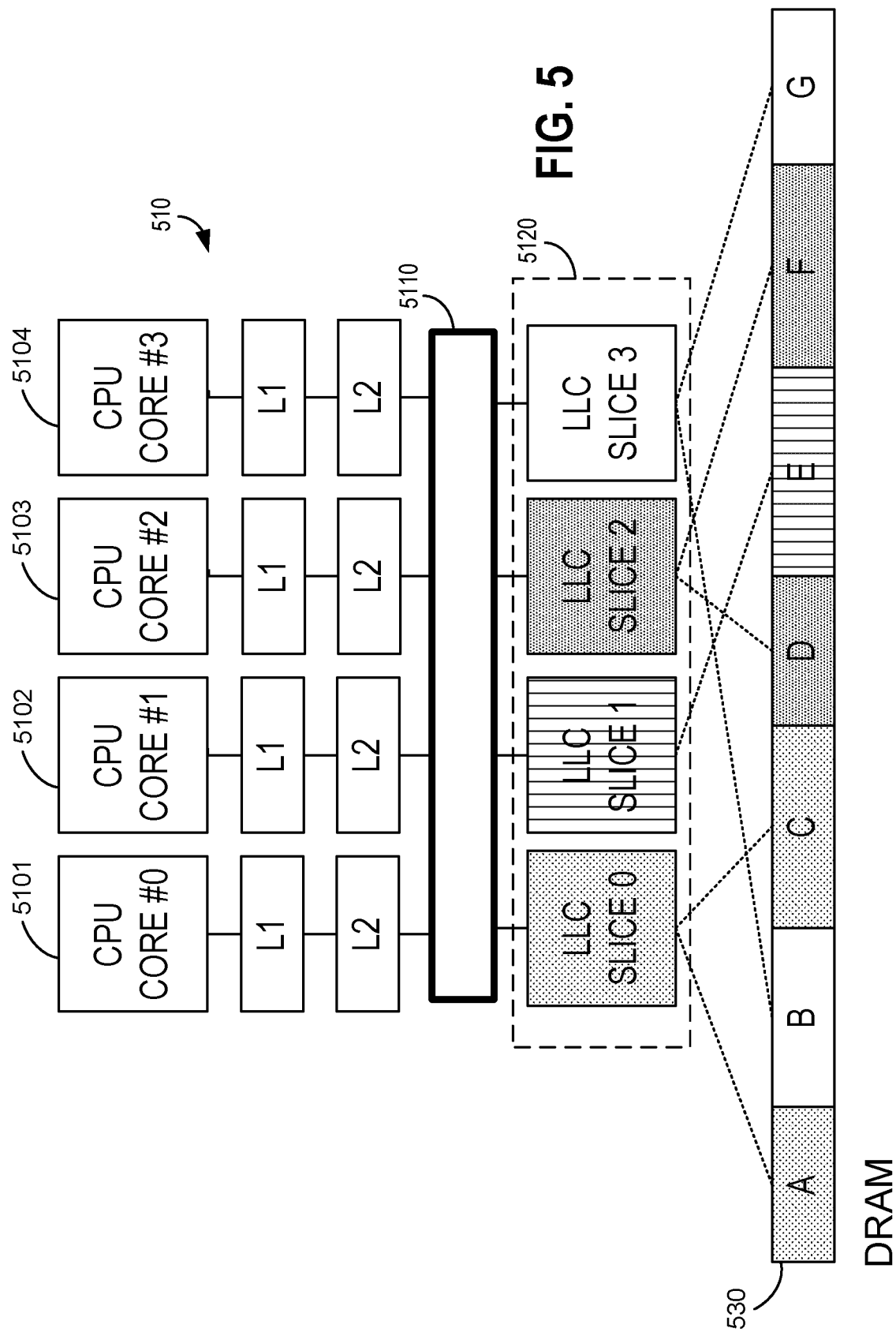
FIG. 5 is block diagram illustrating the mapping between different LLC slices and blocks in a DRAM.
Figure 6:
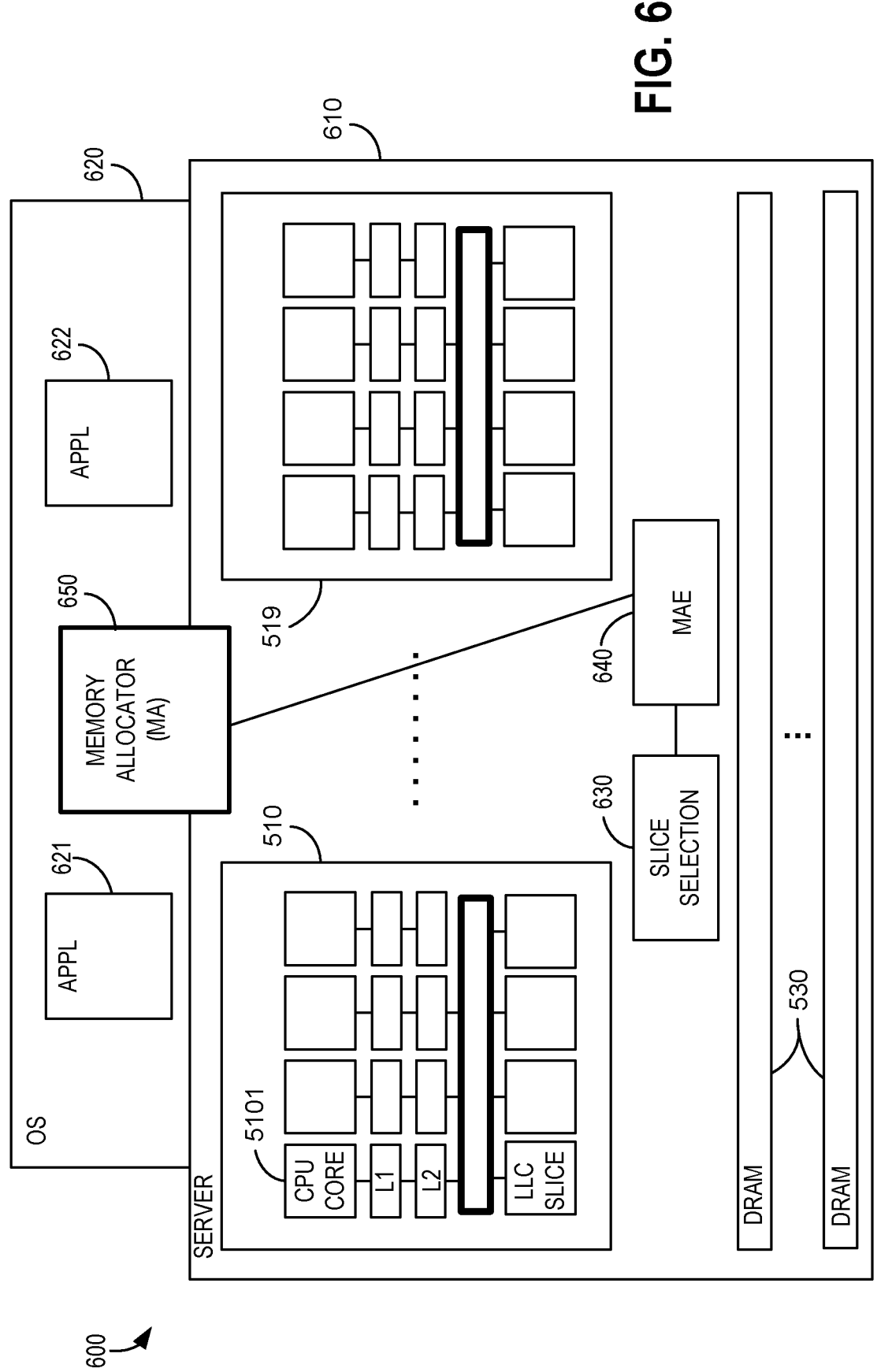
FIG. 6 is block diagram illustrating a computer system with the memory allocator.

FIG. 6 illustrates a system 600 comprising a server 610 built from a number of CPU sockets 510,519 and a main memory, DRAM 530. The CPU socket 510 is illustrated in FIG. 5 and compromises a number of CPU cores 5101-5104. Each CPU core 5101-5104 has a dedicated L1 and L2 cache. All CPU cores 5101-5104 in the CPU socket 510 share a last level cache (LLC) 5120 accessible through a interconnect 5110. The LLC 5120 is built up by different slices SLICE 0-3. Returning to FIG. 6, an operating system OS 620 is running on the server 610 that can host different applications 621,622. An application can be pinned to only use one CPU core in the system. A memory allocator MA 650 is the entity that is responsible for allocating memory from available physical memory to applications upon application requests. The memory allocator MA 650 can be implemented as part of the OS 620 but can also be implemented in hardware as part of server 610 or partly in OS and partly in hardware.

In one embodiment of the system 600 an entity called memory allocator enhancer MAE 640 is used. The MAE 640 can be implemented as a node in HW (e.g., FPGA) or in software (e.g., as part of the memory allocator MA) or partially in HW and partially in software. The MAE 640 assists the memory allocator MA 650 to decide which part of available physical memory 530 should be assigned to the application. The MAE 640 is responsible for obtaining data on how the different LLC slices are mapped, for example by monitoring the physical memory units 530 and 5120.

In one embodiment the MAE 640 (as separate entity or included in the MA 650) is coupled to a Slice selection algorithm entity 630 which is defining how the data from DRAM 530 should be loaded in to which slices in LLC i.e. the mapping of the different portions of the DRAM 530 to the different slices SLICE 0-3. It also communicates with the memory allocator 650 and/or the OS 620 (or the hypervisor) to receive information regarding application priority, e.g., how much memory the application is requesting, and which CPU core the application is running on. In one embodiment, the MAE 640 simply includes a table of the mapping on how different portions of the DRAM 530 will be mapped to different slices SLICE 0-3. In one embodiment the Slice selection algorithm entity 630 provides an API that can be queried by MAE 640.

As illustrated by FIG. 5, the LLC 530 is divided into multiple slices SLICE 0-3. Each slice SLICE 0-3 is associated with one and only one CPU core 5101-5104. When associating each slice to a CPU core, the distance (in terms of data access time between the CPU core and the slice) is minimized as far as possible. For example, in FIG. 4, CPU core #0 is preferably associated with LLC slice 0 or slice 2 for which the data access time is among the shortest. The same procedure applies to the other slice/CPU core pairs. The CPU cores and all LLC slices are interconnected by network on chip (NoC), e.g., a bi-directional ring bus 5110. Again, all slices are accessible by all CPU cores.

The slice selection algorithm entity 630 (implemented as a hash function in Intel processors—but might be realized in a different way by different vendors) decides which portion A-G of the DRAM 530 is associated to which slice SLICE 0-3 (see FIG. 5). In other words, when the CPU core needs data, and the data is not available in different levels of the cache and should be loaded from DRAM 530, the Slice selection algorithm entity 630 defines that the requested data from that address of DRAM 530 should be loaded to which of the slices in the LLC 5120.

As an example, the blocks A+C of the DRAM 530 will be mapped to Slice 0, block B+G to Slice 3, block D+F to Slice 2, and block E to Slice 1.

Figure 7:
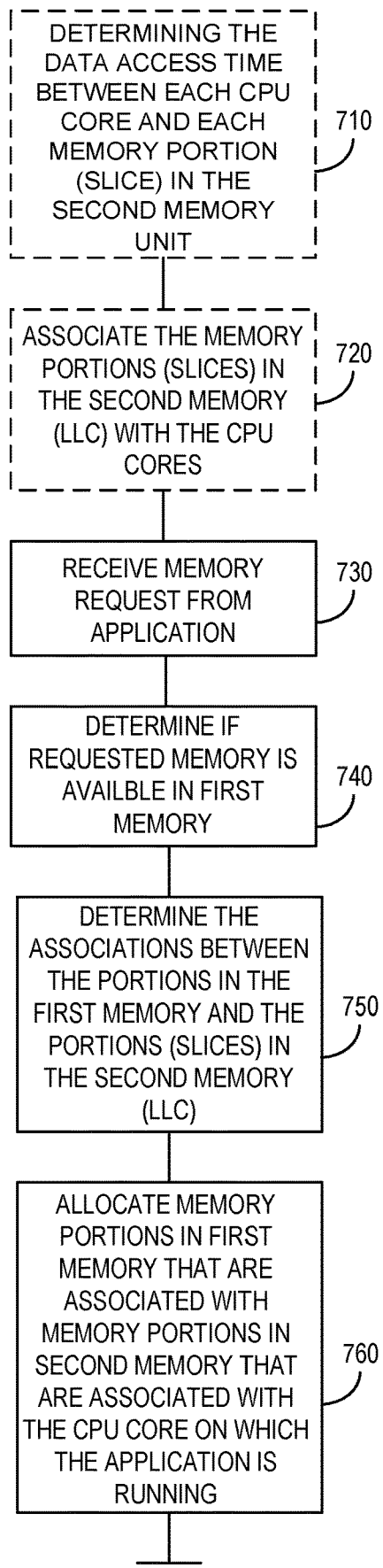
FIG. 7 is a flow chart illustrating an embodiment of the method to allocate memory to an application.

The flow chart in FIG. 7 illustrates an embodiment of the method to allocate memory in the DRAM 530 to an application 621.

Figure 4:
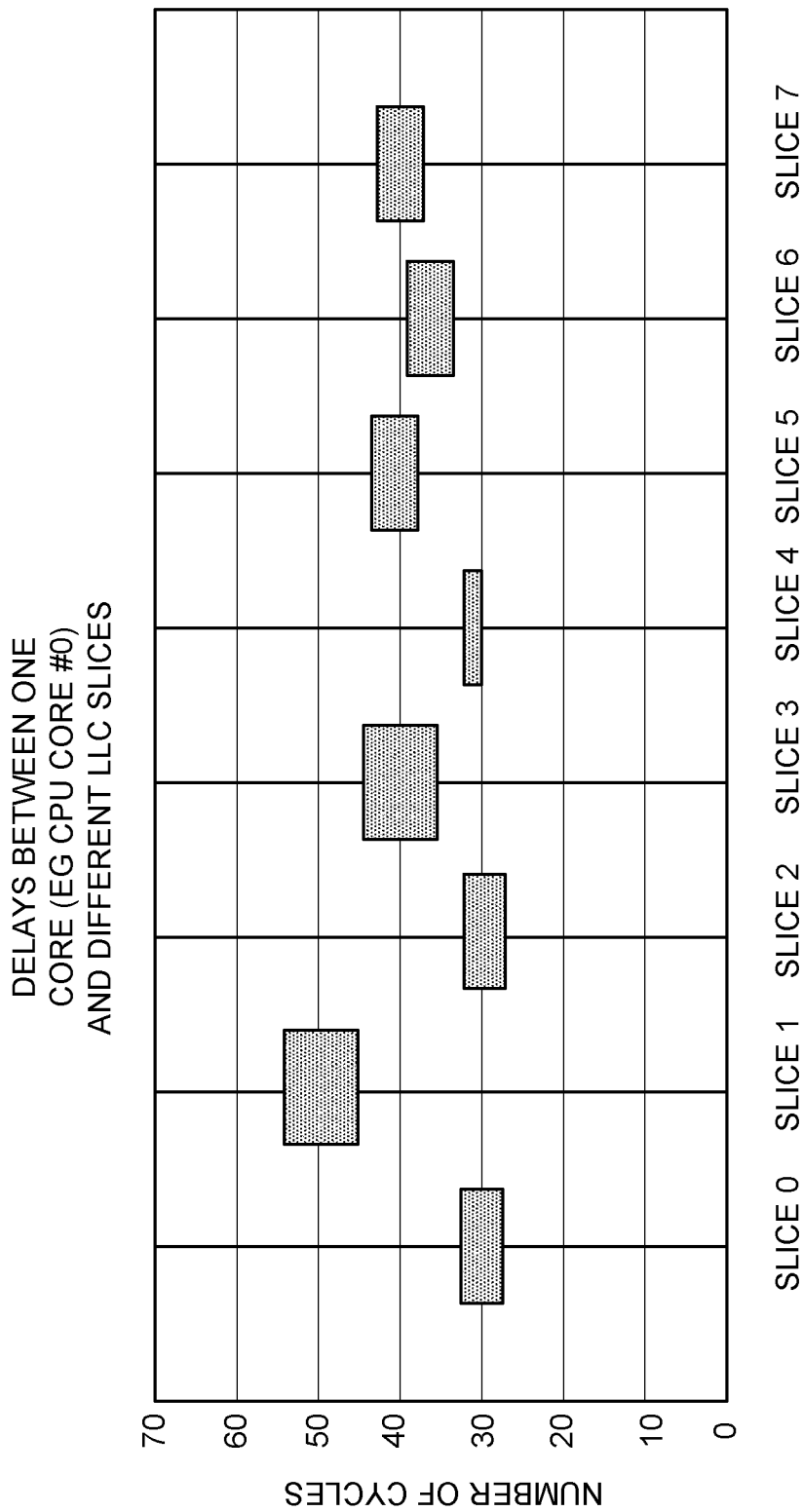
FIG. 4 is diagram illustrating the delays between a CPU core and different LLC slices.

In an initial step 710 the data access time between each CPU core 5101-5104 and each memory portion SLICE 0-3 in the second memory LLC 5120 is determined by measurements as illustrated by FIG. 4.

In Step 720 each memory portion SLICE 0-3 in the second memory LLC 5120 is associated with a CPU Core 5101-5104 by selecting the memory portion in the second memory unit 5120 for which the data access time between the CPU core 5101-5104 and the memory portion SLICE 0-3 is among the lowest compared to other memory portions SLICE 0-3 in the second memory unit 5120. It is possible to associate a plurality of memory portions SLICE 0-3 in the second memory unit 5120 to the same CPU core 5101-5104. When CPU cores are using shared data, the reverse can apply, that is, one memory portion SLICE 0-3 in the second memory unit 5120 can be associated to a plurality of CPU Cores 5101-5104.

Steps 710 and 720 can be executed by the memory allocator 650 but can also be done by other means in advance.

The application 621 sends in step 730 a request to the memory allocator 650 to allocate a portion of memory to it. In step 740 the memory allocator 650 determines if requested memory is available in the DRAM 530.

The determination that the requested memory is available involves finding memory portions A-G from the DRAM 530 that meets the requirement in term of memory size (for example using an algorithm such as the Buddy algorithm). Normally the memory allocator 650 and OS look for parts of the memory 530 with the same size that the application requested. The requested memory can be selected from anywhere within the available physical memory in the DRAM 530 and its address space, as the memory allocator 650 and OS 620 have no notion of how different portion of memory will be mapped to different slices in the LLC 5120.

In step 750 the memory allocator 650 determines which memory portions SLICE 0-3 of the second memory unit LLC 5120 is associated with the memory portions (A-G) in the first memory unit DRAM 530 being part of the requested available memory.

This can be done in different ways. In its simplest embodiment the memory allocator 650 can have a preconfigured table showing how the different portions A-G of the first memory DRAM 530 will be mapped to the different portions (slices) SLICE 0-3 in the second memory unit LLC 5120.

In another embodiment the step 750 is performed by the memory allocator 650 together with a separate entity, a memory allocator enhancer MAE 640 which in turn can have an API to the Slice selection algorithm entity 630. In an alternative embodiment the memory allocator 650 and the memory allocator enhancer 640 are integrated in one entity.

When using the memory allocator enhancer 640, the memory allocator 650 sends the address of the selected memory portion (or series of options that meet the application requirements in term of memory size) and information regarding which CPU core that application is running on, to the memory allocator enhancer 640.

The memory allocator enhancer 640 then communicates with the Slice selection algorithm entity 630 to see if the selected memory is mapped to the right slice (i.e., based on information about the CPU core that application is running on). If any of the proposed memory portions are mapped to the right slice (the slice associated with the CPU Core the application 621 is running on), then the memory allocator enhancer 640 informs the memory allocator 650 that the address is approved. Else it will ask the memory allocator 650 to find another candidate and the process resumes from step 740.

Optionally the memory allocator enhancer 640 might also check other metrics to decide whether the proposed portion is a right portion or not (e.g. memory type, memory location, memory bandwidth, etc.)

The described embodiments below optimize the allocation of memory to the application by considering the notion of how different memory blocks in the DRAM 530 will be mapped to different slices. As an example, in FIG. 5, when the application running on CPU core 0 request a memory, the memory from region A or C will be given to that application. By this means the data from region A and C will be loaded to slice 0 and as a result, the CPU core 0 access that data faster.

In the embodiment the memory allocator 650 and the OS 620 use the memory allocator enhancer 640, the request from the memory allocator enhancer 640 to the slice selection algorithm entity 630 contains the one (or list of) candidate physical memory portion(s) and/or the corresponding CPU core that application running on it. The response from the slice selection algorithm entity 630 can just be Yes/No (due to security to not expose the algorithm) or can contain which slice that address will be mapped. In a second case the memory allocator enhancer 640 could store the mapping for future in a one table. In this case, when the address comes to the memory allocator enhancer 640 then first the memory allocator enhancer 640 can look in a table and if the information regarding mapping is not available then it sends a request to the slice selection algorithm entity 630.

The slice selection algorithm entity 630 maps physical memory portions (also called memory chunks) to different LLC slices. The size of memory chunk is defined by slice allocation algorithm (e.g., the minimum chunk is 64B). On the other hand, the memory allocator 650 and OS 620 have a smallest fixed-length contiguous block of physical memory that can be addressed known as memory pages (e.g. a minimum memory page is 4 KB).

It might not be possible (e.g., memory chunk size is smaller than memory page size) or not required (due to application requirement or other, for example performance, constrains) that all of the requested memory be mapped to right slice.

In this case, the memory allocator enhancer 640 receives one (or list of) memory block(s) (e.g. block of memory page size) as a proposal from memory allocator 650. The memory allocator enhancer 640 then divides a selected memory block into different chunk size. Then memory allocator enhancer 640 evaluates all the chunks. If the number of chunks in a memory block that are mapped to right slice is more than a threshold (this threshold can be configured and be dynamic) then the proposed memory page is accepted else the memory allocator enhancer 640 will request the memory allocator 650 to find another memory block(s). By this we can ensure some percentage of allocated memory is mapped to the right slice.

To ensure that the application memory always is mapped to right slice even if the chunk size is smaller than page size:

Assume application request for memory size A. Assuming the chunk size is equal to C.

Then we need to find K=A/C number of chunk to meet the application requirement.

Assuming the uniform distribution of the slice selection algorithm the memory allocator then needs to select the memory with the size of (A×Number of LLC slices) to secure K chunks.

The memory allocator enhancer 640 evaluates the memory selected by the memory allocator 650 and finds all chunks that maps to the right slice. Then it will return the address of all chunks that maps to right slices. Then the application 621 only writes to the chunk that are mapped to right LLC slice(s).

If at least a predetermined number of memory portions in the first memory unit DRAM 530 being part of the available requested memory are associated with the memory portion in the second memory unit LLC 5120 that is associated with the CPU core on which the requesting application 621 is running, the memory allocator 650 allocates in step 760 the requested available memory to the requesting application 621.

Again, in an alternative embodiment, the memory allocator MA 650 (or the integrated MA 650+MAE 640) has knowledge about the slice selection algorithm or the mapping between the memory portions in the DRAM 530 and the slices in the LLC 5120 beforehand. In that case, instead of communicating with the Slice selection algorithm 630, the MA 650 (or MA 650+MAE 640) can have a preconfigured table showing how the different portions of the DRAM 530 will be mapped to the slices in the LLC 5120.

Figure 8:
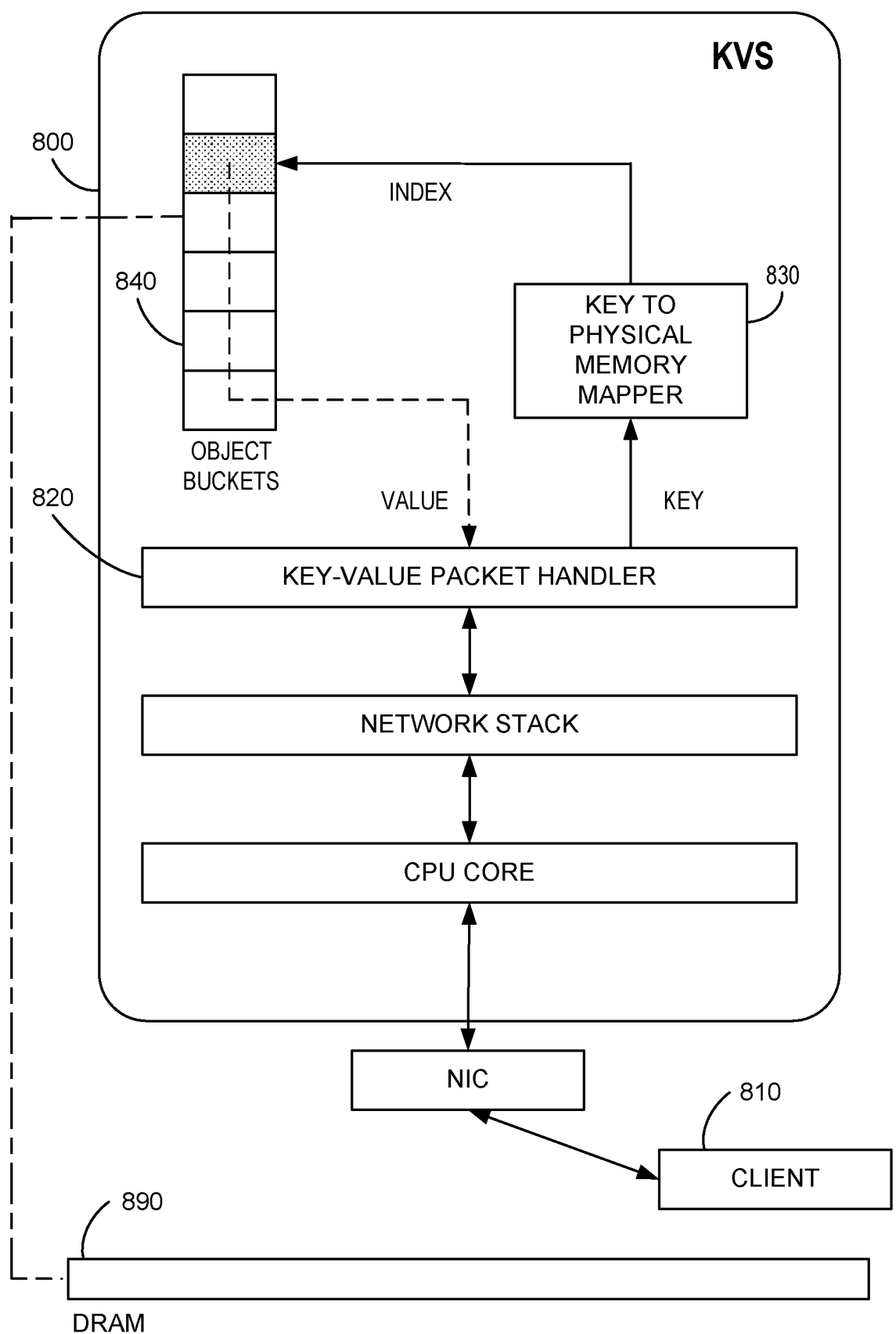
FIG. 8 is block diagram illustrating the principle of a Key-Value Store (KVS) data base.

The memory allocator 650 and the method for allocating memory to applications described above can for example advantageously be used to increase the response time for Key-Value Store (KVS) databases. KVS is a type of database in which clients send a request for a key and server(s) do different operation based on request type. Two common operations supported by a KVS are read & write requests, which are also known as GET & SET. FIG. 8 shows an example architecture for a simple KVS 800. When a client 810 sends request to the KVS 800, the Key-value packet handler 820 will parse the packet to find the type of request as well as the key, and then the Key to Physical Memory Mapper 830 will look up a memory location for the value of the requested key (e.g. based on a hashing or any other scheme) or allocate a memory, e.g., if the key is not registered and the request type is SET. Thereafter, it will do read/write the value from/to memory locations. Finally, KVS 800 will reply to the client 810 according to the type of the request.

At the initialization phase, the KVS 800 allocates a memory region from DRAM 890 for its key-value pairs, aka object buckets 840. The size of this memory region can be increased during run-time if KVS 800 requires more memory. KVS workloads usually follow a Zipfian (Zipf) distribution, i.e., some keys are more frequently accessed. This characteristic results in accumulation of some values in cache hierarchy.

Figure 9:
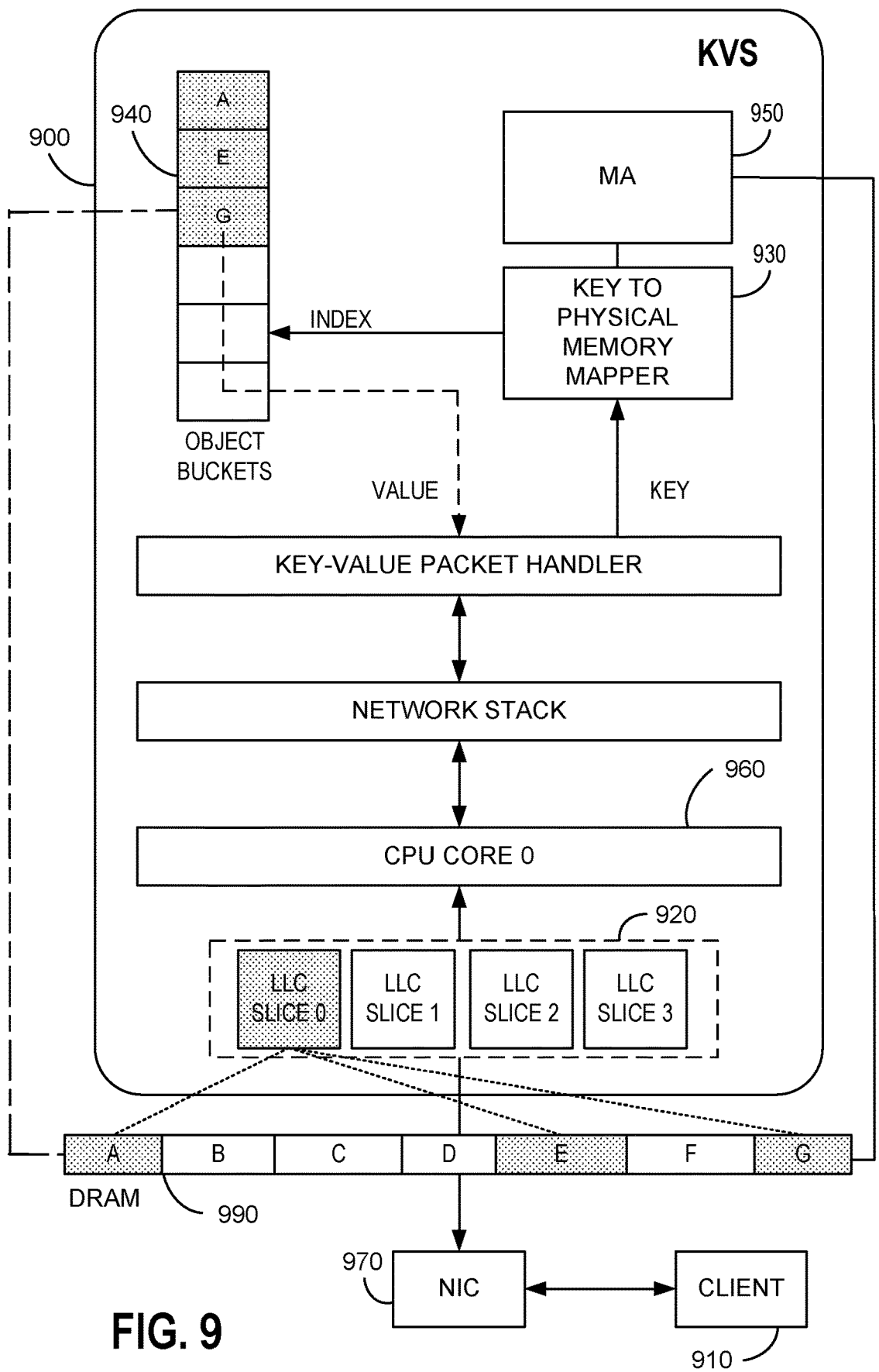
FIGS. 9-10 are block diagrams illustrating different embodiments of a KVS database using the memory allocator.

FIG. 9 illustrates a single core KVS 900 that utilizes the memory allocator 950 and takes advantage of the method for allocating memory described above. Its performance is improved by allocating the memory/object buckets 940 from the portion(s) of the DRAM 990 that are mapped to the appropriate (closest) slice(s) in the LLC 920 associated with the CPU core 960 that is responsible for serving the requests.

By doing so, KVS 900 will load the value of requested keys into the closest (appropriate) LLC slice(s). Later on, when the KVS 900 gets a request for a key, it can serve the request faster, as the key will be residing in the closer LLC slice.

Step 1. At initialization phase, the memory allocator 950 assesses different memory portions of the DRAM 990 to identify whether it is appropriate or not.

Step 2. If the assessed memory portion in DRAM 990 is appropriate, then memory allocator 950 will update the Key to Physical Memory Mapper 930 so that this memory can be used.

Step 1 and step 2 will be run in a loop until the KVS application gets enough memory from the DRAM 990 (this value can be set by administrator or by any other way). These steps can also be done when the KVS 900 requests for extra memory at run-time. In the example shown in FIG. 9, the portions A, E and G of the DRAM 990 are associated to LLC SLICE 0, which is the appropriate slice for KVS 900 running on CPU core 0.

Step 3. From this point, KVS 900 continue with its typical workflow. When a request is received at the Network Interface Card NIC 970, it will be handled by different stacks (e.g., Network stack and KVS Packet Handler) and finally the key will be given to Key to Physical Memory Mapper 930. In this sample architecture we have assumed that the NIC 970 sends the packets to the correct CPU core (the CPU core responsible for that key), but if the NIC 970 does not do the dispatching properly, the packets can be sent to a designated core which know the key partitioning and then sends the packets to the responsible core.

Step 4. The Key to Physical Memory Mapper 930 finds the address of the value corresponding to the requested key and then fetches that value. At this step, the application fetches the value faster as we have ensured that the value is residing in a memory region that is mapped to the appropriate LLC slice(s) (step 1 and step 2).

Step 5. The response will be sent to the client 910.

NOTE: The described scenario only shows cases in which the value exists for a given key, the value is available at LLC, and the request is GET. A similar approach can be used for other operations of KVS such as SET.

As KVSs need to serve millions of requests in real-world scenarios, they are typically using more than one CPU core. However, since accessing a memory region by multiple cores/threads would cause synchronization problems, KVSs should use thread-safe data structures to avoid any race condition. The thread-safe data structures are quite expensive and degrade performance in general. Therefore, KVS typically partitions their data among different cores to avoid this overhead. In such a system, the memory bucket of each KVS instance is expected to be assigned in a way that it will be mapped to the closer (faster) LLC slice(s) of its relevant CPU core. By doing so, KVS can serve the requests faster.

Two different embodiments of a multicore KVS are described:

1. Using an independent memory allocator MA for each instance of KVS that is running on a different core.
2. Using one memory allocator MA for different instances of KVS, each running on a different core.

Figure 11:
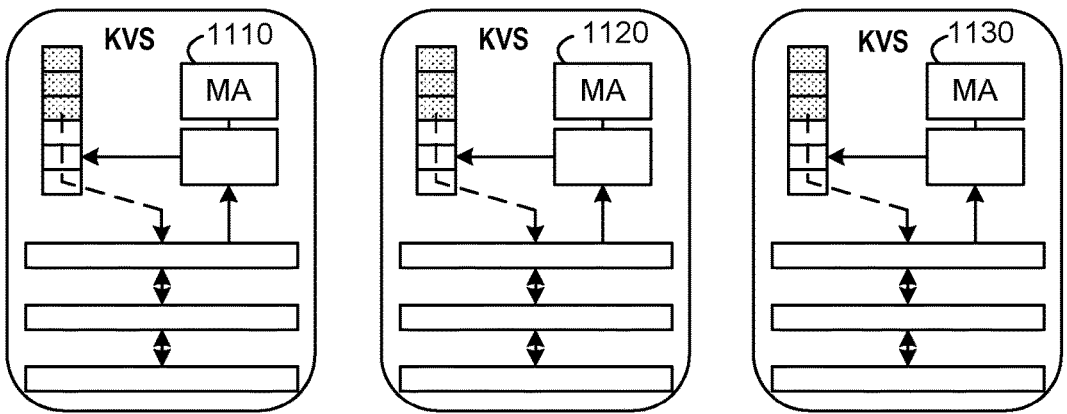
FIGS. 11-12 are block diagrams illustrating a multicore Key-Value Store (KVS) data base.

The first embodiment as illustrated by FIG. 11 is an extension of single-core KVS described above. In this embodiment, every CPU core will run an independent instance of KVS, each of which can independently manage 1110, 1120, 1130 and configure its memory in a way that the memory (object) bucket of each KVS instance get mapped to the appropriate LLC slice(s).

Figure 12:
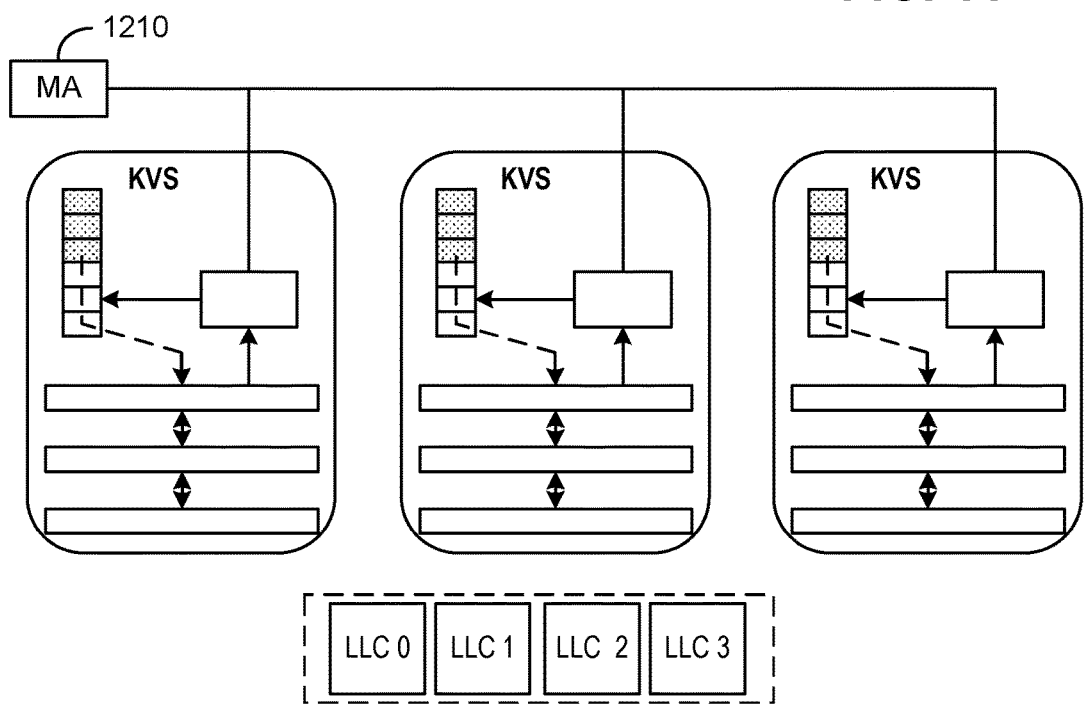

In the second embodiment illustrated in FIG. 12, a multicore KVS can use a single memory allocator MA 1210 to allocate memory for different instances/cores.

Step 1. At initialization phase, the memory allocator assesses different memory portions of DRAM to find the LLC slice, to which the memory address is being mapped.

Step 2. Based on the acquired mapping, the memory allocator checks whether this memory region is appropriate for any of the KVS instances running on a different core or not. If so, it will update the Key to Physical Memory Mapper so that this memory can be used to save values for different instances. It's worth mentioning that Key to Physical Memory Mapper can be implemented as an independent entity for every CPU core or as a single entity for all of the cores/instance. Step 1 and step 2 will be run in a loop until KVS get enough memory from DRAM for every instance/core of the KVS. Note that these steps can also be done when the KVS requests for extra memory. Step 3 to 5 will be similar to the steps explained in single-core model for KVS.

Figure 10:
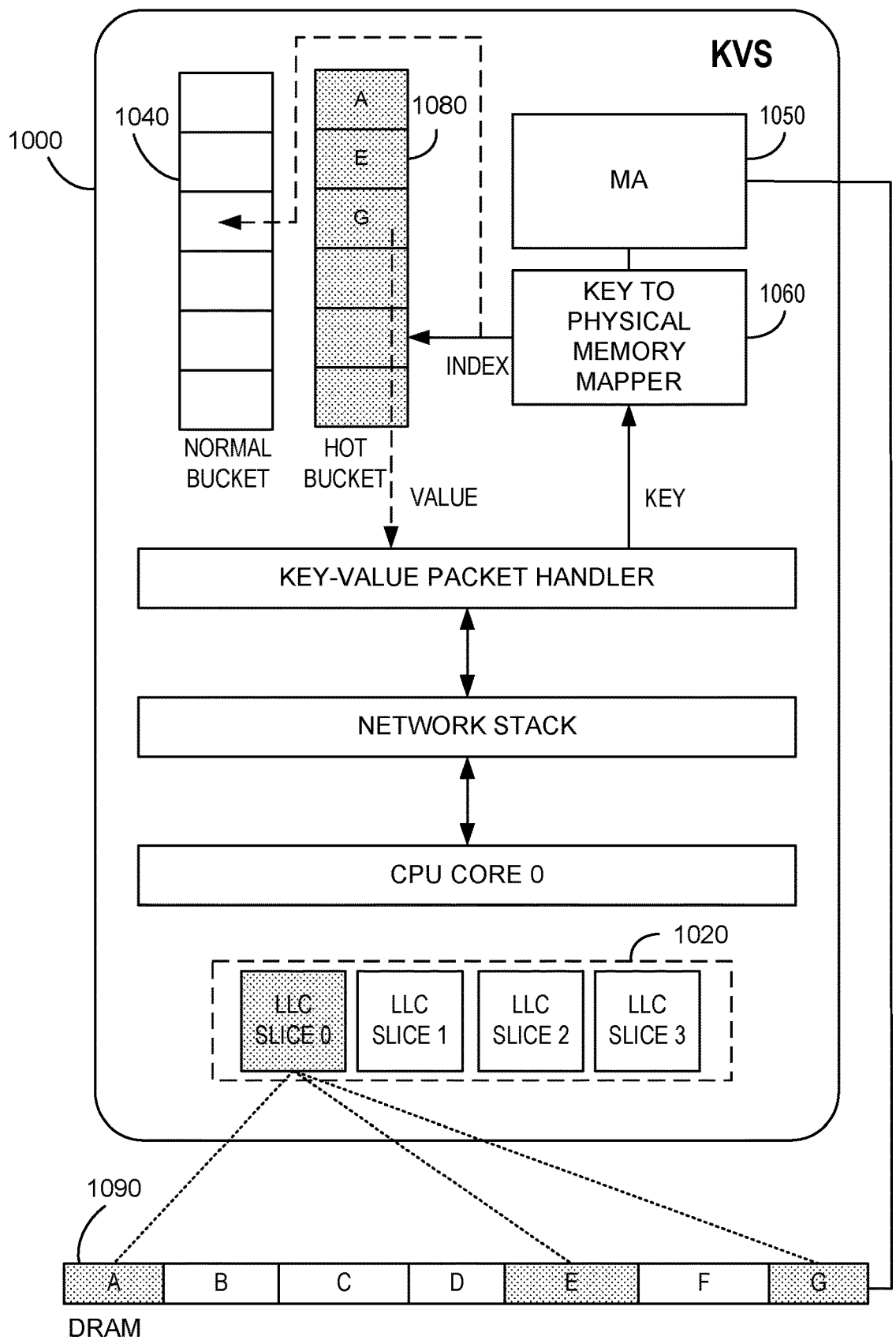

In an alternative embodiment to FIG. 9 as illustrated by FIG. 10, the KVS 1000 can allocate its memory 1090 normally, but it can monitor the popularity of the keys at run-time and migrate the "hot" keys (the keys that are accessed more frequently) to regions in memory 1090, which are mapped to the appropriate (e.g., closer and faster) LLC slices in the LLC 1020.

In this case, the memory allocator 1050 will not map all of the buckets/its memory to the appropriate slice. Rather, it uses two different buckets, a Hot Bucket 1080 and a Normal Bucket 1040. The Hot Bucket 1080 is mapped to the appropriate LLC slice(s) and accommodates the "hot" keys, i.e., frequently accessed keys. The Normal Bucket 1040 is allocated based on normal memory allocation and hosts the rest of the keys.

This scenario can be implemented in two different ways:

Run-Time Migration:

In this case, every instance of the KVS will allocate two buckets during initialization phase: i) Normal Bucket 1040 and ii) Hot Bucket 1080. Normal Bucket 1040 would use the normal memory allocation (or other alternatives) and Hot Bucket 1080 will be allocated in a way that it will be mapped to the appropriate LLC slice(s).

The Hot Bucket 1080 can be as large as a Normal Bucket or it can be smaller to save memory usage. This can be configured by system administrator or any other entity.

In this model, all key-value pairs will use the Normal Bucket 1040, but the KVS will do a run-time monitoring to detect the hot/popular keys.

Upon finding a hot key, i.e., a key has been accessed more than a specific number of times, KVS will migrate that key to the Hot Bucket. Note that migration will be easy, as real-world workloads are mostly read-intensive. Therefore, it is just the matter of data duplication in the Hot bucket 1080, updating the mapping table at Key to physical memory mapper 1060, and then data invalidation in normal bucket.

On-Demand Migration:

In this model, KVS would follow a similar approach as run-time migration case, but instead of automatically detecting the keys. An agent, a prediction engine in the system or any other entity (not shown), can explicitly specify the hot keys manually at any given point of time. Therefore, whenever the KVS is notified, the specified keys would be migrated from the Normal Bucket to the Hot Bucket.

The invention claimed is:

1. A method performed by a memory allocator in a computer system for allocating memory to applications, wherein the computer system comprises at least one computer server comprising a plurality of central processing unit (CPU) cores, the plurality of CPU cores comprising a first CPU core and a second CPU core, and the computer server further comprising at least a first memory unit and a second memory unit having different data access times, and wherein the second memory unit is divided into a plurality of slices, wherein the plurality of slices of the second memory unit comprises a first slice and a second slice, the first slice is associated with the first CPU core, and the second slice is associated with the second CPU core, the method comprising:

receiving a request from an application for allocating memory to the application, wherein the application is running on the first CPU core;

in response to the request, selecting a memory block from the first memory unit, wherein the memory block comprises a set of memory chunks;

determining whether at least T number of the memory chunks included in the selected memory block of the first memory unit are associated with the first slice of the second memory unit, where T is a predetermined threshold;

in response to determining that at least T number of the memory chunks included in the selected memory block of the first memory unit are associated with the first slice of the second memory unit, allocating the selected memory block to the requesting application.

2. The method of claim 1, further comprising monitoring a selection algorithm that controls which memory chunks in the first memory unit are loaded into a slice of the second memory unit; and determining which memory chunks of the first memory unit are associated with the first slice of the second memory unit.

3. The method of claim 2, wherein the selection algorithm uses a hash function.

4. The method of claim 2, wherein the monitoring of the selection algorithm is done by a memory allocation enhancer unit.

5. The method of claim 1, further comprising, for each CPU core in the plurality of CPU cores, determining a data access time between the CPU core and each slice of the second memory unit.

6. The method of claim 5, further comprising associating each CPU core with at least one slice of the second memory unit based on the determined data access times.

7. The method of claim 1, wherein the first memory unit is a dynamic random-access memory (DRAM), and the second memory unit is a last level cache (LLC).

8. A memory allocator in a computer system for allocating memory to applications, wherein the computer system comprises at least one computer server comprising a plurality of central processing unit (CPU) cores, the plurality of CPU cores comprising a first CPU core and a second CPU core, and the computer server further comprises at least a first memory unit and a second memory unit having different data access times, and wherein the second memory unit is divided into a plurality of slices, wherein the plurality of slices of the second memory unit comprises a first slice and a second slice, the first slice is associated with the first CPU core, and the second slice is associated with the second CPU core, further wherein the computer system is further comprising a processor and a memory containing instructions which, when executed by the processor instructs the memory allocator to perform a method comprising:

receiving a request from an application for allocating memory to the application, wherein the application is running on the first CPU core;

in response to the request, selecting a memory block from the first memory unit, wherein the memory block comprises a set of memory chunks;

determining whether at least T number of the memory chunks included in the selected memory block of the first memory unit are associated with the first slice of the second memory unit, where T is a predetermined threshold;

in response to determining that at least T number of the memory chunks included in the selected memory block of the first memory unit are associated with the first slice of the second memory unit, allocating the selected memory block to the requesting application.

9. A Key Value Storage data base comprising the memory allocator of claim 8.

10. The memory allocator of claim 8, further comprising monitoring a selection algorithm that controls which memory chunks in the first memory unit are loaded into a slice of the second memory unit; and determining which memory chunks of the first memory unit are associated with the first slice of the second memory unit.

11. The memory allocator of claim 10, wherein the selection algorithm uses a hash function.

12. The memory allocator of claim 10, wherein the monitoring of the selection algorithm is done by a memory allocation enhancer unit.

13. The memory allocator of claim 8, further comprising, for each CPU core in the plurality of CPU cores, determining a data access time between the CPU core and each slice of the second memory unit.

14. The memory allocator of claim 13, further comprising associating each CPU core with at least one slice of the second memory unit based on the determined data access times.

15. The memory allocator of claim 8, wherein the first memory unit is a dynamic random-access memory (DRAM), and the second memory unit is a last level cache (LLC).

\* \* \* \* \*